United States Patent
Ritter et al.

(10) Patent No.: US 9,135,604 B2
(45) Date of Patent: Sep. 15, 2015

(54) SYNCHRONIZING REAL AND VIRTUAL SOFTWARE DEVELOPMENT

(71) Applicants: Daniel Ritter, Heidelberg (DE); Manuel Holzleitner, Karlsruhe (DE)

(72) Inventors: Daniel Ritter, Heidelberg (DE); Manuel Holzleitner, Karlsruhe (DE)

(73) Assignee: SAP SE, Walldorf (DE)

( * ) Notice: Subject to any disclaimer, the term of this patent is extended or adjusted under 35 U.S.C. 154(b) by 155 days.

(21) Appl. No.: 13/908,620

(22) Filed: Jun. 3, 2013

(65) Prior Publication Data
US 2014/0359554 A1 Dec. 4, 2014

(51) Int. Cl.
| | |
|---|---|
| G06F 7/00 | (2006.01) |
| G06F 17/00 | (2006.01) |
| G06F 15/16 | (2006.01) |
| G06F 15/177 | (2006.01) |
| H04L 29/06 | (2006.01) |
| G06F 3/00 | (2006.01) |
| G06F 9/44 | (2006.01) |
| G06F 9/45 | (2006.01) |
| G06F 9/455 | (2006.01) |
| G06F 9/46 | (2006.01) |
| G06Q 10/10 | (2012.01) |
| G06Q 10/06 | (2012.01) |

(52) U.S. Cl.
CPC .......... *G06Q 10/103* (2013.01); *G06Q 10/0631* (2013.01)

(58) Field of Classification Search
CPC ............ G06F 8/20; G06F 8/34; G06F 9/455; G06F 11/3664; G06F 11/3495; G06F 17/504; G06F 17/5045; G06F 17/505; G06F 9/45504; G06F 9/45529; G06F 9/542; G06F 9/45558
See application file for complete search history.

(56) References Cited

U.S. PATENT DOCUMENTS

| | | | | |
|---|---|---|---|---|
| 5,301,327 | A * | 4/1994 | McKeeman et al. | 717/145 |
| 6,915,336 | B1 * | 7/2005 | Hankejh et al. | 719/328 |
| 7,266,565 | B2 * | 9/2007 | Diab | 707/999.102 |
| 7,275,235 | B2 * | 9/2007 | Molinari et al. | 717/100 |
| 8,341,590 | B1 * | 12/2012 | Poole | 717/101 |
| 8,549,515 | B2 * | 10/2013 | Bobroff et al. | 718/1 |
| 8,806,438 | B2 * | 8/2014 | Bates | 717/125 |
| 2005/0065966 | A1 * | 3/2005 | Diab | 707/102 |
| 2005/0066306 | A1 * | 3/2005 | Diab | 717/108 |

(Continued)

OTHER PUBLICATIONS

Holzleitner, Manuel, et al.: U.S. Appl. No. 13/601,228, filed Aug. 31, 2012 entitled "In-Order Message Processing with Message-Dependency Handling"; 43 pages.

(Continued)

*Primary Examiner* — Don Wong
*Assistant Examiner* — Anibal Rivera
(74) *Attorney, Agent, or Firm* — Fish & Richardson P.C.

(57) ABSTRACT

Synchronizing real and virtual software environments. A first input of an entity identifier that identifies a software development entity and a second input of an operation identifier that identifies a software development operation that has been performed on the entity in a physical environment are received. The entity identifier and the operation identifier are on a first and second physical medium, respectively. The entity and the operation are identified in response to receiving the inputs. A virtual software development environment is updated to reflect that the operation has been performed on the entity in the physical environment. The entity and the operation are associated with a software development model that is also associated with the virtual environment.

20 Claims, 7 Drawing Sheets

(56) References Cited

U.S. PATENT DOCUMENTS

| | | | |
|---|---|---|---|
| 2006/0053380 A1* | 3/2006 | Spataro et al. | 715/753 |
| 2007/0011659 A1* | 1/2007 | Venolia | 717/127 |
| 2007/0220484 A1* | 9/2007 | Takahashi et al. | 717/109 |
| 2007/0283321 A1* | 12/2007 | Hegde et al. | 717/110 |
| 2008/0104212 A1* | 5/2008 | Ebrom et al. | 709/222 |
| 2009/0019429 A1* | 1/2009 | Randow et al. | 717/130 |
| 2009/0100405 A1* | 4/2009 | Belenky et al. | 717/104 |
| 2009/0193388 A1* | 7/2009 | Nojiri et al. | 717/101 |
| 2009/0249226 A1* | 10/2009 | Manolescu et al. | 715/757 |
| 2010/0192072 A1* | 7/2010 | Spataro et al. | 715/753 |
| 2012/0067944 A1* | 3/2012 | Ross | 713/150 |
| 2012/0089534 A1 | 4/2012 | Liebig et al. | |
| 2012/0089685 A1 | 4/2012 | Hoffmann et al. | |
| 2012/0124124 A1* | 5/2012 | Beaty et al. | 709/203 |
| 2013/0097320 A1 | 4/2013 | Ritter et al. | |
| 2013/0198290 A1* | 8/2013 | Thomas | 709/205 |

OTHER PUBLICATIONS

Ritter, Daniel, et al.; U.S. Appl. No. 13/315,041, filed Dec. 8, 2011 entitled "Information Validation"; 105 pages.

Ritter, Daniel, et al.; U.S. Appl. No. 13/534,504, filed Jun. 27, 2012 entitled "Configuring Integration Capabilities for System Integration"; 44 pages.

* cited by examiner

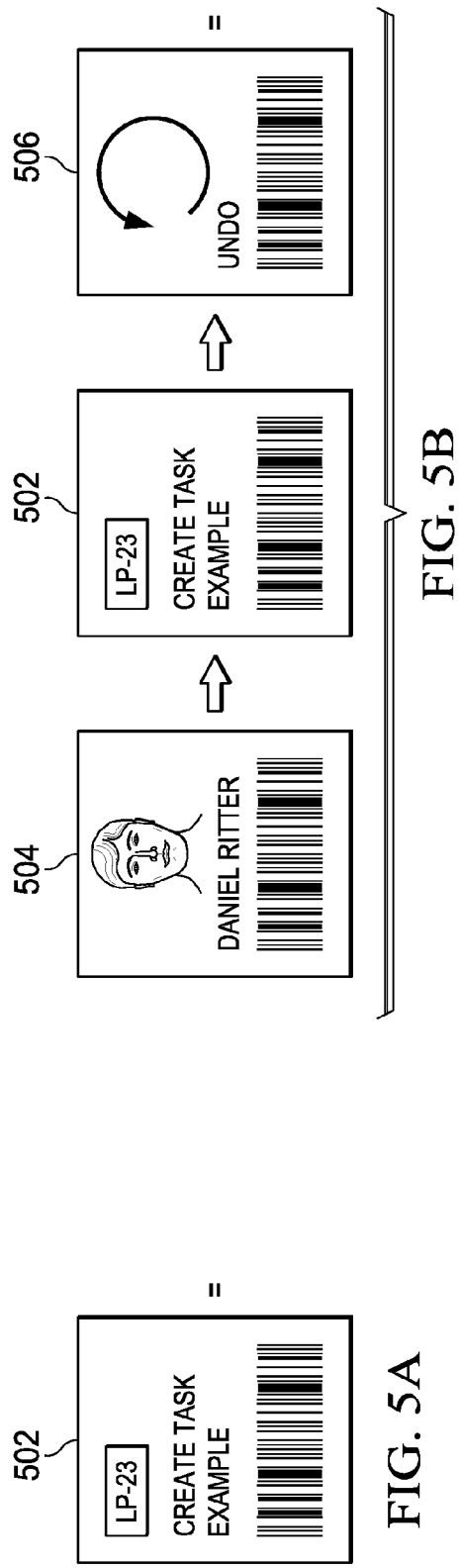
FIG. 5A
FIG. 5B
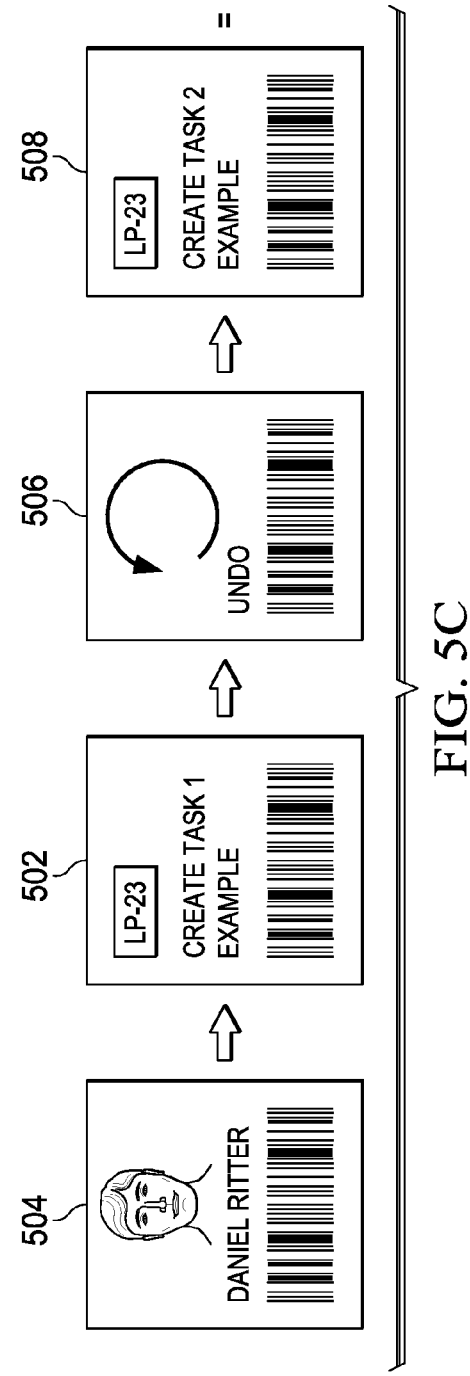
FIG. 5C

SYNCHRONIZING REAL AND VIRTUAL SOFTWARE DEVELOPMENT

TECHNICAL FIELD

This disclosure relates to computer-implemented methods, computer-readable media, and computer systems for software planning and development.

BACKGROUND

Software development is a collaborative activity in which team members brain storm to identify features to be included in the software being developed, and then develop and include the features in the software, e.g., by writing code. The software development can be performed in a virtual environment, e.g., using computer systems. For example, each team member can access a central server computer system using a respective client computer system, and work collaboratively with other team members in the virtual environment. This arrangement gives the team members freedom to work from any geographical location. The software development can also be performed in a real, physical environment. For example, team members can meet in conference rooms and discuss features that can be included in the software being developed. The team members can track the development, e.g., by outlining development strategies on physical media, e.g., white boards, note pads, and other suitable physical media. Such face-to-face meetings between team members can be beneficial to the software development. However, development strategies, goals, and initiatives arrived at during such face-to-face meetings need to be transferred to the virtual environment.

BRIEF DESCRIPTION OF THE DRAWINGS

FIGS. 5A-5C are examples of identifiers printed on physical media.

Figure 1A:
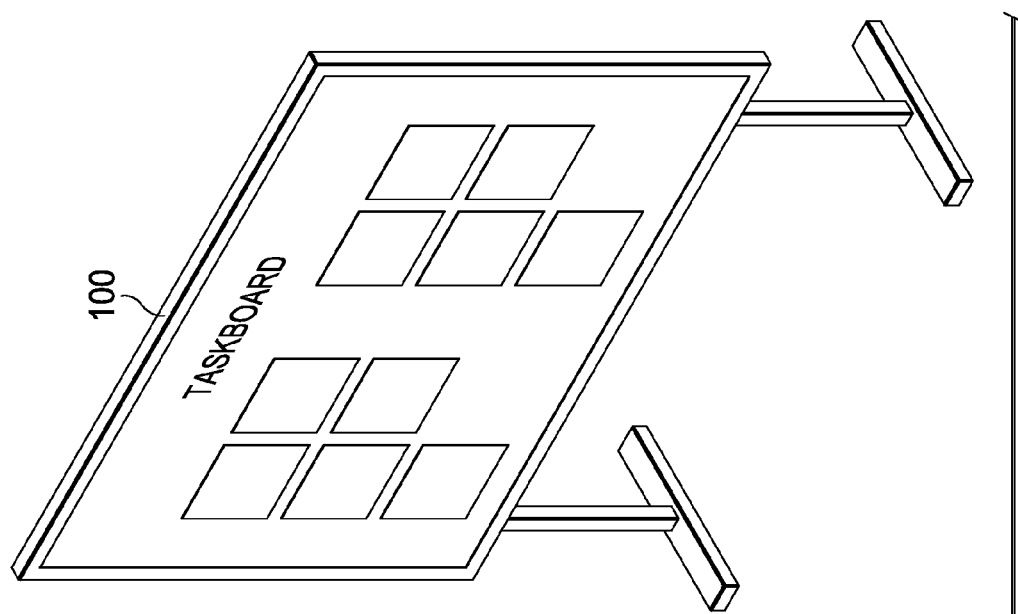
FIGS. 1A, 1B and 1C illustrate an example physical environment and virtual environment for software development activities.
Figure 1A:
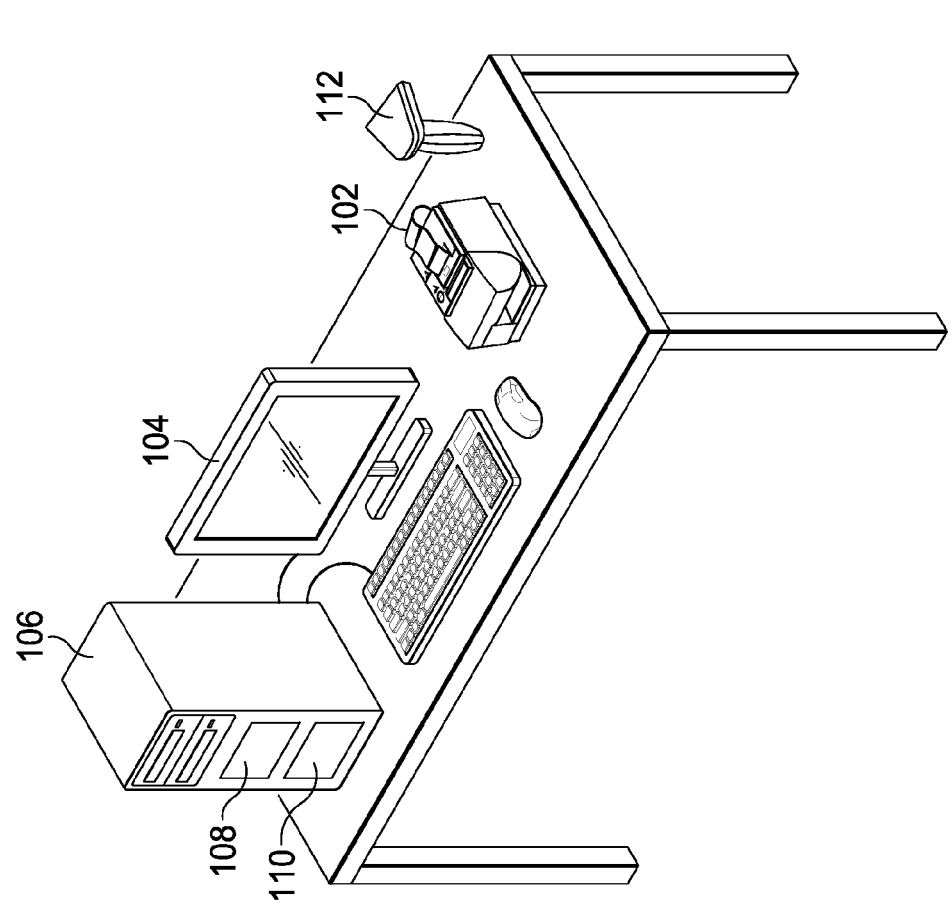

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features and advantages of the disclosure will be apparent from the description and drawings, and from the claims.

Like reference numbers and designations in the various drawings indicate like elements.

DETAILED DESCRIPTION

This disclosure relates to computer-implemented methods, computer-readable media, and computer systems for synchronizing real and virtual software development. Real software development refers to software development activities performed in a physical environment, i.e., a collaborative software development environment. Software development teams work collaboratively in virtual environments using, e.g., issue planning software (such as Jira® provided by Atlassian, Inc. of CA) for software development activities including organizing complex product backlogs with cross-team transparency. Development activities performed in virtual environments are easily available to members of cross-location teams who are not located in the same physical (i.e., geographical) location. The development activities are also stored on a computer system and available for future reference or auditing or product documentation.

Teams also tend to work in the physical environment using, e.g., physical white boards that are adapted to the team's working style and environment. Examples of white boards that teams can use in the physical environment include Kanban boards, Scrum boards, and the like. Doing so can enable fast, flexible planning that is adapted to the physical environment in which the team is located, e.g., a conference room with a table, chairs, and a white board.

Working in the virtual environment and the physical environment can make teams more productive relative to working in only one of the two environments. For example, when team members work collaboratively in a conference room and have access to a backend software system, the team members can leverage the benefits of the physical and virtual environments and avoid the drawbacks of each. However, doing so can result in a software/hardware disconnect due to the lack of synchronization between the two environments, which, in turn, can render the collaboration expensive and inefficient.

Software development in both the virtual environment and the physical environment allow development teams to leverage the benefits of each environment while avoiding each environment's drawbacks. Unless the development activities performed in a physical environment are synchronized with those performed in a virtual environment (and vice versa), the collaboration can be inefficient.

One technique to synchronize the physical environment activities with the virtual environment includes manual actions, e.g., by printing the activities on sheets of paper, cutting the sheets of paper into desired sizes, affixing the sheets to the white board during the development stages, and other suitable actions. Often the printed sheets of paper are not optimally adapted to the printer formats (e.g., A4 size paper) and require physical cutting and trimming resulting in offcuts (i.e., wasted paper). For example, an agile development team masters approximately 25 tasks a spring (2 work weeks). The time for the administrative tasks (e.g., 6-8 tasks) is reported to be one hour. For these tasks, 25 pages of A4 paper have to be printed of which only 2 pages are actually needed; the rest are offcuts. Over a year, this sums up to approximately 650 sheets of paper and 26 work hours for a team. For a program with up to ten teams, each having ten members, the quantity of time and resources wasted is considerably high. Moreover, synchronizing the two environments requires at least one dedicated person to transfer development activities in the physical environment to the virtual environment.

This disclosure describes techniques to synchronize software development activities in physical environments and virtual environments in an efficient manner. The synchronization functionality can be implemented as a comprehensive approach in a running system that offers the advantages of performing software development activities in the virtual and physical environments, e.g., speed, flexibility, adaptability, extensibility and customizability to individual teams, ability to share development activities with team members in different geographical locations, ability to track and store the development activities for auditing or reference for product documentation, reduction in offcuts, and other advantages. The techniques described here can be implemented in any collaborative development environment regardless of the physical environment in which the development team operates. The techniques can negate the need to implement smart displays in which almost all activities occur in a virtual environment presented on a medium that permits physical interaction.

Figure 1B:
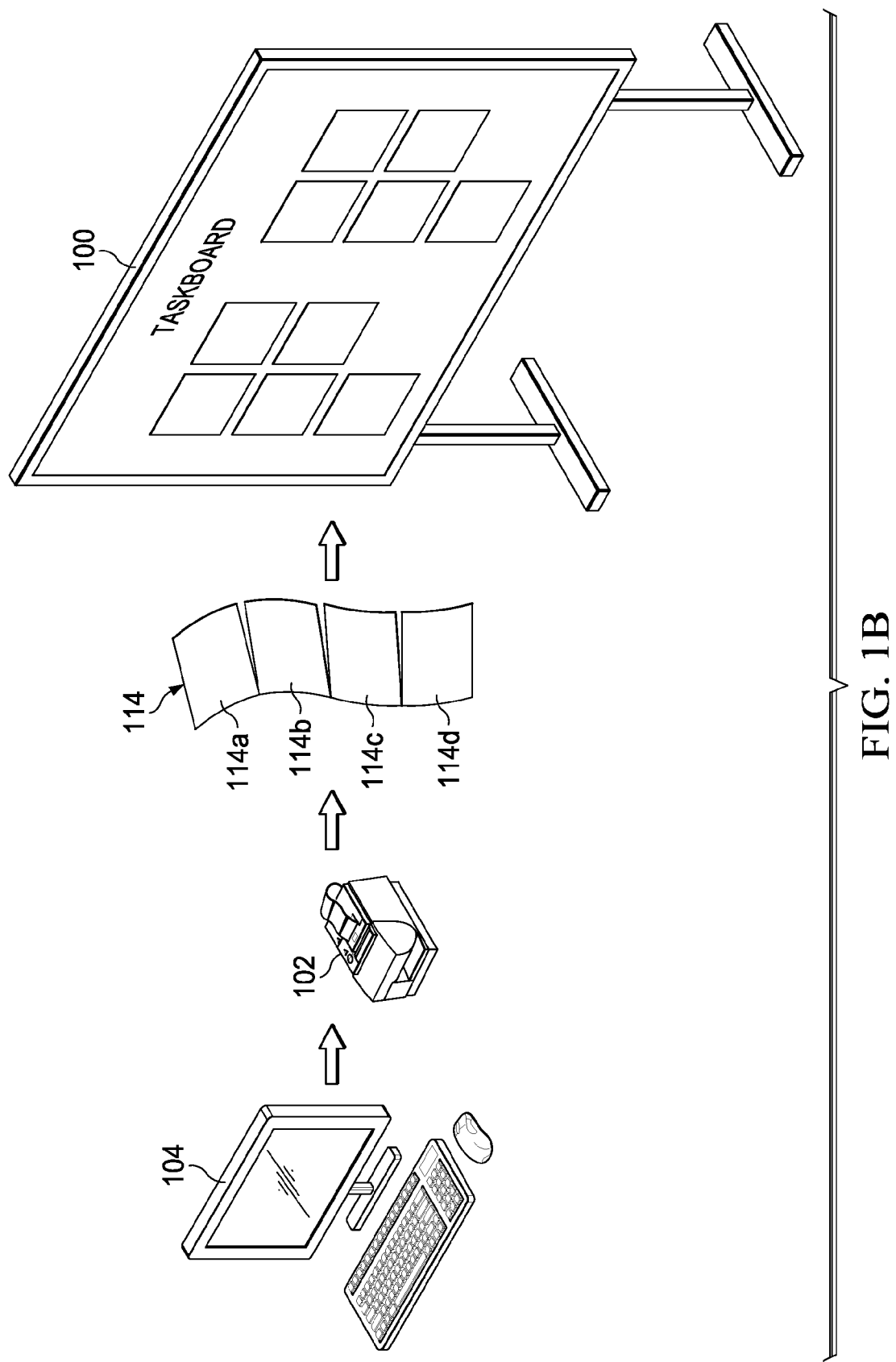
Figure 1C:
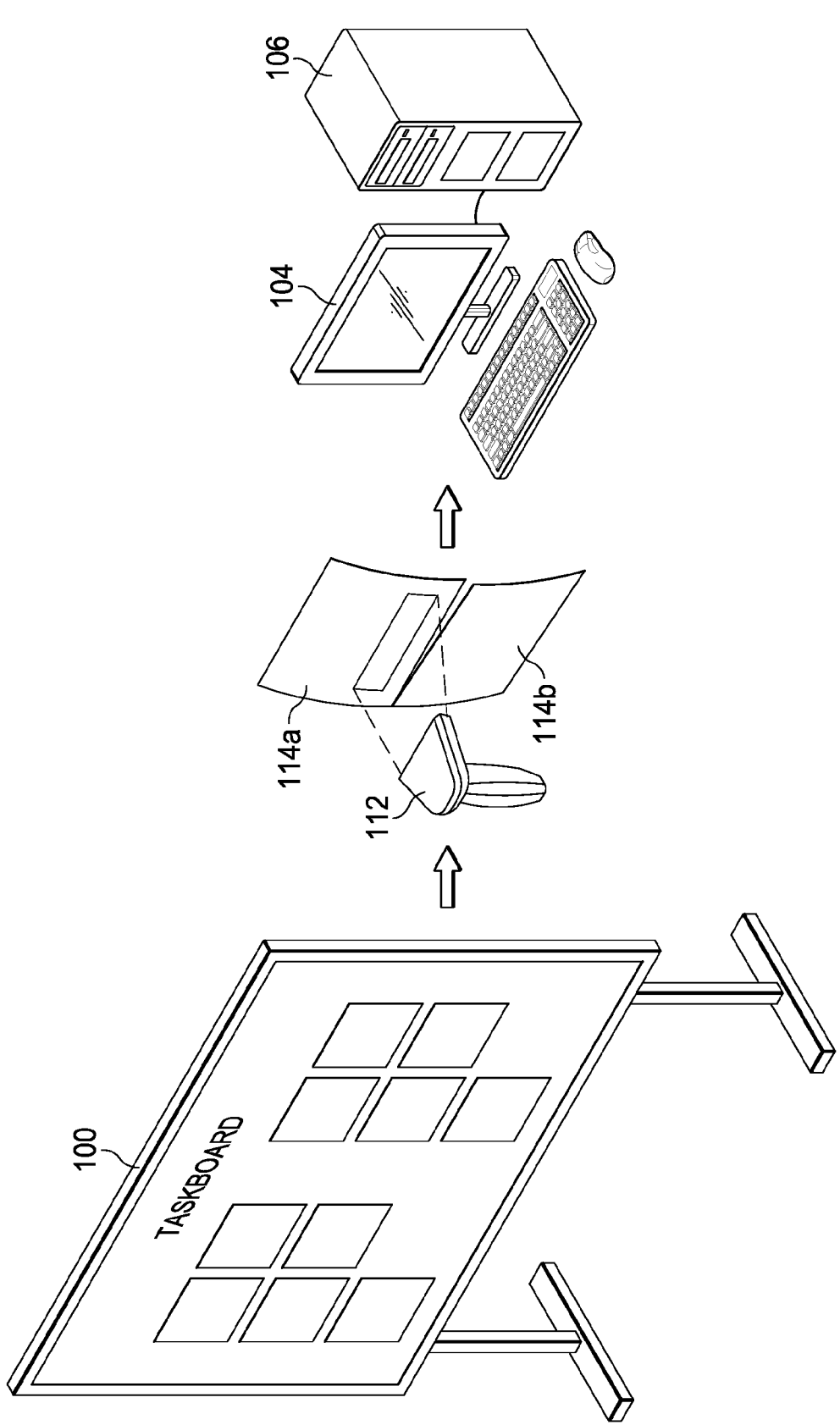

FIGS. 1A, 1B and 1C illustrate an example physical environment and virtual environment for software development activities. The physical environment includes a physical surface 100 with which the software development team deals in their day-to-day work. The surface can be any planning board or any surface that supports any working style, e.g., Kanban, Scrum, Whiteboard, Blackboard, Pinboard, Flipchart, Wall, Furniture, or other suitable surface. For example, the physical surface 100 is a white board (or task board) in a location, such as a conference room, in which team members work to develop the software.

Figure 2:
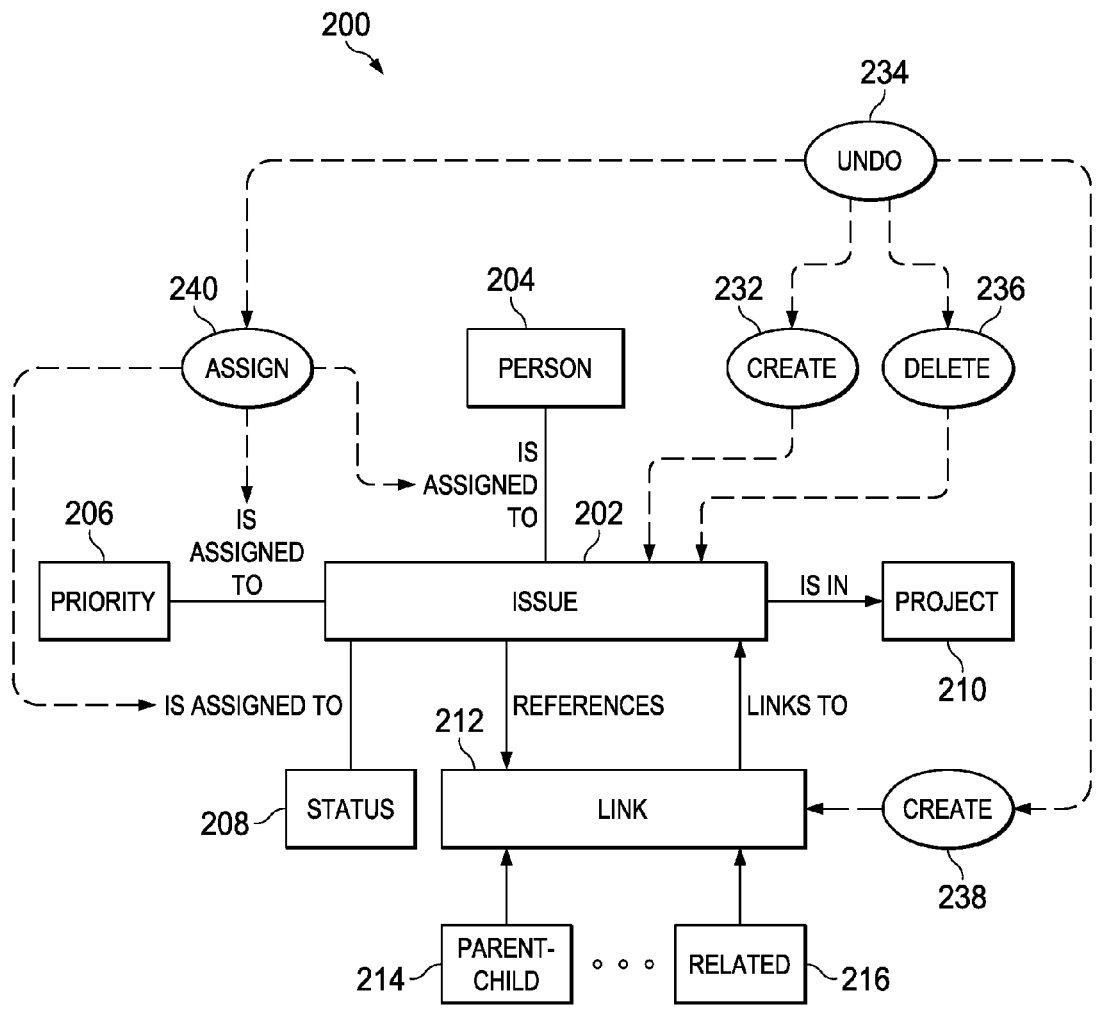
FIG. 2 illustrates an example software development model implemented to synchronize development activities in the virtual environment and the physical environment.

Team members can implement a computer system 104 to generate identifiers that identify respective software development aspects (described below with reference to FIG. 2). The computer system 104 can include, e.g., a desktop computer, a laptop computer, a tablet computer, a smart phone, a personal digital assistant (PDA), or any other suitable computer system. The computer system 104 can implement operations (e.g., by executing computer software applications) to generate identifiers, each of which uniquely represents a software development aspect. As described below, each aspect of the software development can be assigned a unique identifier using which the aspect can be tracked during the lifecycle of the aspect.

An identifier can include a barcode that can be printed, e.g., on paper. Alternatively, an identifier can be any mark that can be associated with an aspect of the software development (described below with reference to FIG. 2) to uniquely identify the aspect. When the mark is tracked (e.g., using appropriate hardware) in the physical environment, the mark can be recognized in the virtual environment by the computer system 104. For example, the identifier can be any alphanumeric character or a symbol or combinations of them that can be generated by executing a computer software application and identified (i.e., recognized) using appropriate hardware. The identifier can be, e.g., optical (a barcode, a QR-code, a number sequence recognizable by optical character recognition methods, object/face recognition), electronic (RFID), gestures (kinect, Wii), audio (speech recognition) to name a few.

When generated using the computer system 104, the identifiers are virtual and reside in the virtual environment, e.g., on a backend computer system 106 connected to the computer system 104 over one or more wired or wireless networks, e.g., the Internet. In addition to the identifiers, the backend computer system 106 can store data associated with the development of the software including the aspects of the software development. The backend computer system 106 can implement the virtual environment that includes a task planning software and also implement the synchronization functionalities described here to synchronize software development activities that team members perform in the physical environment, e.g., using the physical surface 100, with the virtual environment. Alternatively, the backend computer system 106 can implement the synchronization functionalities and be connected to another backend computer system (not shown) that can implement the task planning software, store the data associated with the development of the software or implement the virtual environment (or both). In some implementations, the backend computer system 106 can implement one or more of the virtual environment, the synchronization functionalities, other functionalities, or combinations of them as computer instructions stored on a computer-readable medium 108 and executable by data processing apparatus 110.

The team members can transfer the generated identifiers from the virtual environment to the physical environment, specifically, to physical media. A physical medium can include any surface (flat or otherwise) on which an identifier can be affixed, e.g., a paper, an item of clothing, and the like. Affixing an identifier to a physical medium can include any technique to make a mark on the physical medium, e.g., writing, printing, embossing, projecting, to name a few. The affixing can be permanent, e.g., an erasable writing, or permanent, e.g., an embossing, removing which can result in the physical medium becoming unfit for reuse. In some implementations, the physical medium can be a post-it (or similarly sized) paper. In others, the physical medium can be a t-shirt on which an identifier can be screen printed, and the t-shirt worn by a team member. In some implementations, the physical medium can be a door to the conference room; the identifier can be printed on a piece of paper and stuck to the door. Thus, a physical medium can be any medium to which the identifier can be affixed either directly or through another physical medium. For example, for an optical identifier, the medium can be any printable medium. For an electronic identifier, the medium can be an active or passive RFID medium. For an audio identifier, the audio medium can be, e.g., a CD, a DVD, an LP, or other medium on which audio identifiers can be recorded or stored or both. For gesture-type identifiers, the medium can be any video device, e.g., a DVD or Blu-Ray, or other suitable bodies.

To transfer an identifier from the virtual environment to the physical environment, a team member can implement a printer 102 connected to the computer system 104. The printer 102 can be any off-the-shelf hardware used in point-of-sales industry, e.g., at a department store. In the example synchronization functionality described here, the printer 102 is a thermal printer which prints small, rectangular pieces of paper. Alternatively, the printer 102 can be any hardware that can affix identifiers to physical media, the identifiers being of the type that can be identified (e.g., scanned) using appropriate identification hardware. Thus, the printer 102 can be any entity that can record or print (or both) the physical media described above. The physical environment can include a barcode scanner 112 that can scan the barcode on a piece of paper. Alternatively or in addition, the physical environment can include any appropriate hardware using which an identifier affixed to a physical medium can be identified (i.e., recognized) in the virtual environment.

In an example workflow described with reference to FIGS. 1B and 1C, a user, e.g., a team member uses the computer system 104 to generate multiple barcodes, each to uniquely identify an aspect of the software development. The computer system 104 transmits the barcodes to the printer 102, which prints the barcodes, e.g., on respective pieces of paper 114. The printer 102 can be configured to automatically cut the paper into respective pieces (for example, a first piece 114a, a second piece 114b, a third piece 114c, a fourth piece 114d), each having a barcode printed thereon. A team member can affix the pieces of paper with the barcodes on the physical surface 100, e.g., the task board, at particular locations that have meaning associated with software development. Each aspect represented by each identifier can be affected by the software development performed by the team members. Often, the positions of the papers on the physical surface 100 can change accordingly.

During a development session, e.g., for each instance of a position of a paper being changed, a team member can scan barcodes of the papers (e.g., the first piece 114a, the second piece 114b) that have been moved to new positions on the physical surface 100, e.g., using the barcode scanner 112. The computer system 104 can identify the aspects of the software development identified by the scanned barcodes. In this manner, team members can track changes to the aspects during the lifecycle of the aspects and during the software development, in general. The identified aspects can be updated in the backend computer system 106. In this manner, the physical environment and the virtual environment can be synchronized.

A software development model 200 that defines aspects of the software development and that is implemented for the synchronization is described below with reference to FIG. 2. Aspects of the software development can be broadly categorized into software development entities and software development operations. A software development entity can be at least one of an issue entity, a person entity, a priority entity or a status entity. A software development operation can be at least one of a create operation, a delete operation, an undo operation or an assign operation. Other suitable entities and operations may be software development entities or operations, respectively. For the connection to eXtreme Feedback Devices (XFD) entities like the feedback device, the type of feedback (e.g., in case of a rocket launcher the coordinates of the developer/or email); in general, these are examples. The model is extensible to all kinds of real world and software entities to be synchronized.

The issue entity 202 can be defined, e.g., in the backend computer system 106. An instance (i.e., an occurrence) of the issue entity 202 include, e.g., a task, backlog item, user story, or bug. The issue entity 202 is part of a project which groups issues, e.g., according to the organization (i.e., project for each team) or according to products (i.e., project for each product). A project 210 can be stored or managed (or both) within one backend system 106. Alternatively, the project 210 (or projects) can be spread across multiple backend systems.

An issue has a lifecycle that is defined by a status, which is an instance of a status entity 208. Instances of the status entity include, e.g., open, in progress, completed or closed. The lifecycle can be different for specific types of issues or projects. A priority, which is an instance of a priority entity 206, can include, e.g., critical, blocker, minor, and can be assigned to the issue to distinguish important issues from relatively less important issues. A person entity 204 can represent a person (or persons) to whom an issue is assigned. The issue entity 202 can also reference a links entity 212 which can link a first issue to a second issue, e.g., in a parent-child association 214. Alternatively, the links entity 212 can link two issues as being related 216 or being duplicates. In this manner, the model 200 can store a hierarchy in which multiple issues can be arranged.

Entities and operations can be associated with each other. For example, an instance of the issue entity 202 can be created by implementing a create action 232. The issue can be assigned, by implementing an assign operation 240, to a person generated as an instance of the person entity 204. The issue can be assigned, by implementing an assign operation 240, a priority (i.e., an instance of the priority entity 206). During the lifecycle of the operation, its status can be tracked based on a status (i.e., an instance of the status entity 208), by implementing an assign operation 240, to the issue. If any instance was improperly created or incorrectly assigned, then an undo operation 234 or a delete operation 236 can be performed. New domain entities can be added as needed and declaratively linked to the existing entities in the model 200.

Identifiers that uniquely represent the entities and the operations can be used to associate the entities and the operations with each other. The association can occur automatically and without user intervention, e.g., on the backend computer system 106. For example, the backend computer system 106 can associate each type of priority with a respective priority identifier, i.e., a first priority identifier for a critical priority, a second priority identifier for a blocker priority, a third priority identifier for a minimal priority, and so on. An issue can be associated with an issue identifier. When a team member scans the issue identifier and the first priority identifier (in any sequence), the backend computer system 106 can automatically assign a critical priority to the issue. Subsequently, when the team member scans the issue identifier and the third priority identifier (in any sequence), the backend computer system 106 can automatically change the priority of the issue from critical to minimal. Similarly, the backend computer system 106 can each type of each entity with a respective entity identifier and each type of each operation with a respective operation identifier, and synchronize changes to the entities or the operations (or both) based on the identifiers received, e.g., through the barcode scanner 112.

Figure 3:
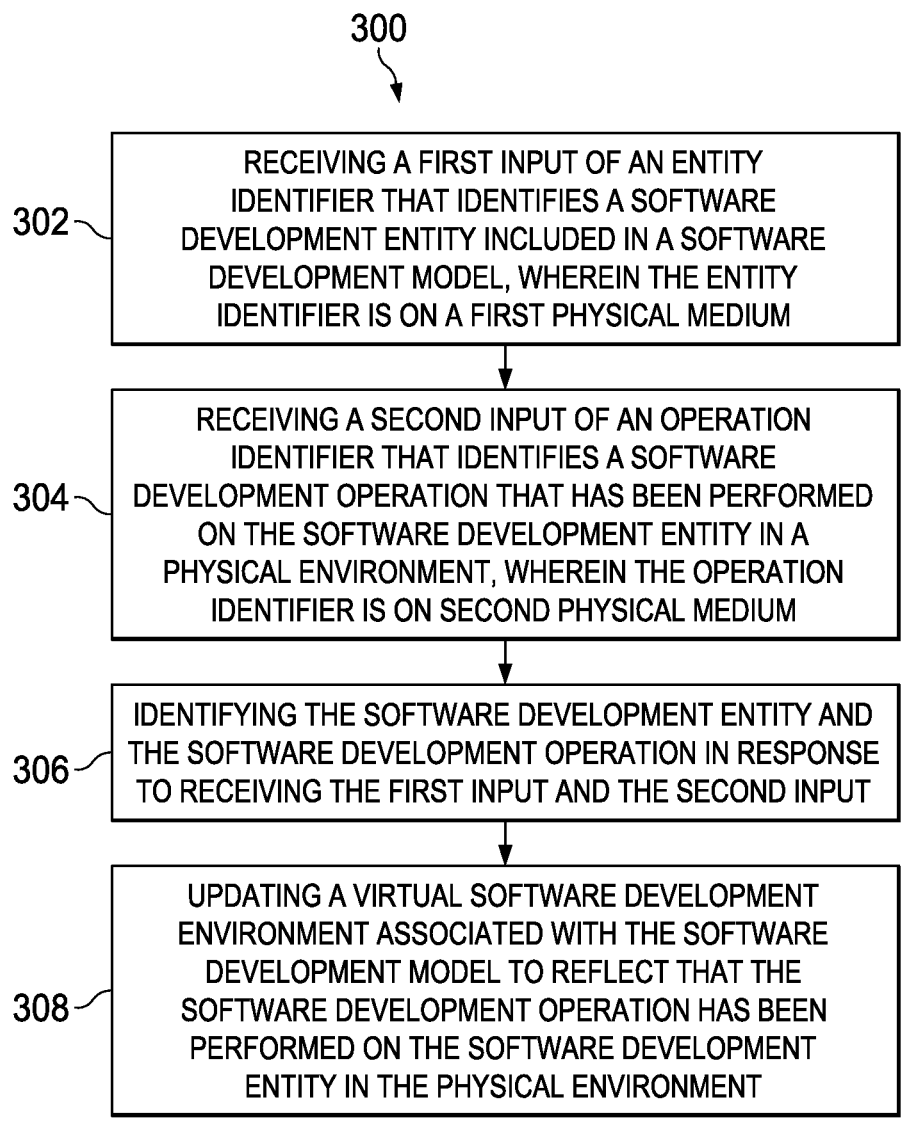
FIG. 3 is a flowchart of an example process for synchronizing software development in the physical environment and the virtual environment.

FIG. 3 is a flowchart of an example process 300 for synchronizing software development in the physical environment and the virtual environment. The process 300 can be implemented as computer instructions stored on a computer-readable medium (for example, the computer-readable medium 108 or by any other suitable computing device or system) and executable by data processing apparatus (for example, data processing apparatus 110 or by any other suitable computing device or system). For example, the process 300 can be implemented by the backend computer system 106 or the computer system 104, as well as any other suitable system, which implements task planning software. For illustrative and example purposes, the process 300 is described with regard to example FIGS. 1A-1C, although any suitable environment or system could be used to implement the idea.

At 302, a first input of an entity identifier that identifies a software development identity included in the software development model 200 can be received. The entity identifier can be on a first physical medium. At 304, a second input of an operation identifier that identifies a software development operation that has been performed on the software development entity in the physical environment can be received. The operation identifier can be on a second physical medium. The entity and the operation can be included in a software development model, e.g., the model 200 described above with reference to FIG. 2.

For example, by implementing the techniques described above with reference to FIGS. 1A-1C, a software development team member can have generated the entity barcode that identifies a previously created issue and the operation barcode that identifies an assign operation. The backend computer system 106 can store the previously created issue and the entity barcode. The team member can have printed the entity barcode and the operation barcode on respective pieces of paper. During software development in the physical environment, the status of the issue can have changed, e.g., from in progress to completed. For example, a team member can have moved a position of the paper that represents the issue from the "In Progress" column on the task board to the "Completed" column. The team member can scan the entity barcode (first input) and then the operation barcode (second input). Alternatively, the team member can scan the operation barcode first and the entity barcode second.

At 306, the software development entity and the software development operation are identified in response to receiving the first input and the second input. In some implementations, the backend computer system 104 can receive the first input (the entity identifier) and the second input (the operation identifier), and identify the software development entity and the software development operation.

At 308, a virtual software development environment associated with the software development model can be updated to reflect that the software development operation has been performed on the software development entity in the physical environment. Updating the virtual environment can include determining a software development operation that has previously been performed on the entity in the virtual environment prior to receiving an input identifying either the entity or the operation, and updating the previously performed operation with the operation received through the input.

For example, the backend computer system 106 can update the task planning software to reflect that the issue identified by the entity identifier received in the first input has been assigned a "Completed" status instead of an "In Progress" status. In some implementations, the updating can include prompting a team member to change the status of the identified issue. To do so, the backend computer system 106 can display a user interface on a display device of a computer system connected to the backend computer system 106. In the user interface, the team member can provide input (or inputs) to change the status of the issue.

Figure 4A:
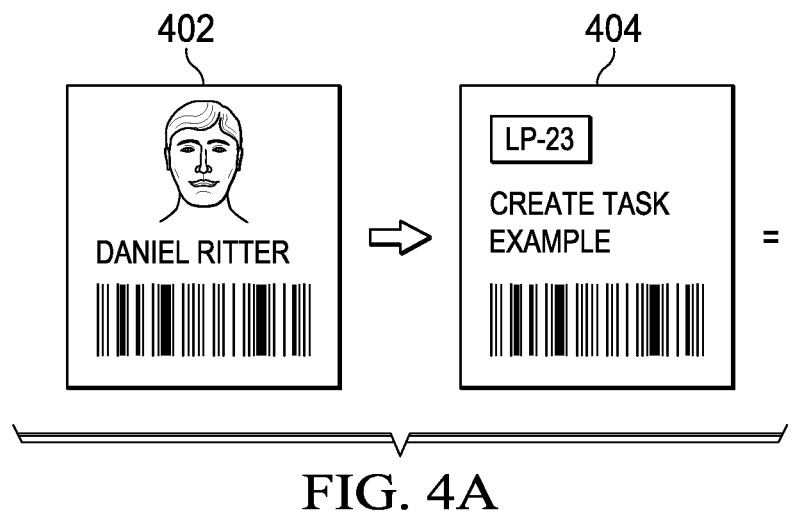
FIGS. 4A and 4B are examples of physical media on which identifiers are printed.

In another example, the backend computer system 106 can have previously created an issue and associated an identifier with the issue. The printer 102 can have printed the identifier on a physical medium 404 (FIG. 4A). The backend computer system 106 can also have previously created a person and associated an identifier with the person. The printer 102 can have printed the identifier on another physical medium 402. A team member can scan the identifier on the physical medium 402 and then scan the identifier on the physical medium 404 (or vice versa). The backend computer system 106 can recognize the sequence of scans as an input to assign the person to the issue.

Figure 4B:
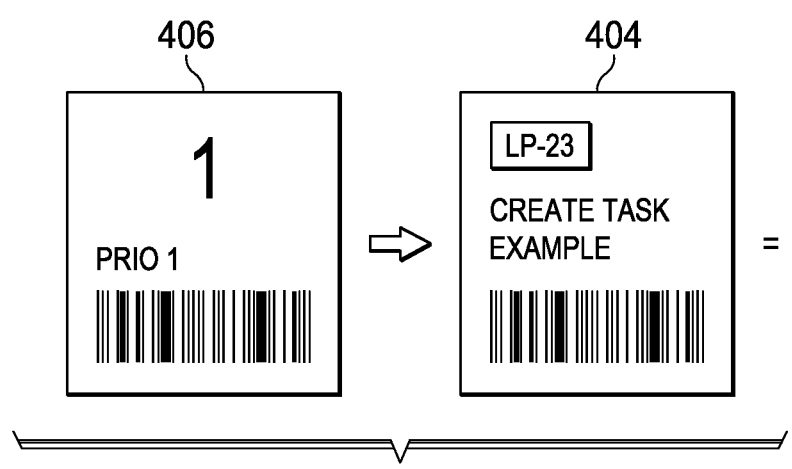

In a further example, the backend computer system 106 can have also created a status and associated a status with the identifier. The printer 102 can have printed the identifier on a physical medium 406 (FIG. 4B). A team member can scan the identifier on the physical medium 406 and then scan the identifier on the physical medium 404 (or vice versa). The backend computer system 106 can recognize the sequence of scans as an input to assign a priority to the issue. Combining the two examples, a team member can scan the identifier on the physical medium 402, then scan the identifier on the physical medium 404, and then scan the identifier on the physical medium 406. In response, the backend computer system 106 can assign the issue to the person, and assign the priority to the issue.

FIGS. 5A-5C are examples of identifiers printed on physical media. In some implementations, a team member can generate a create identifier and cause the generated create identifier to be printed on a physical medium 502, e.g., a paper affixed to the task board. To create a new instance of an entity (e.g., an issue entity or a person entity), the team member can scan the generated create identifier. The backend computer system 106 can receive the scanned create identifier that identifies the create operation. In response, the backend computer system 106 can, automatically and without user intervention, generate a new entity included in the software development model, and present the generated new entity, e.g., in a display device of a computer system that the team member is using. The new entity can be a new issue. The team member can input information describing the new issue. Alternatively, the new entity can be a new person, e.g., a new team member. An existing team member can input information describing the new person. The backend computer system 106 can store the received information. The backend computer system 106 can generate a new identifier and associate the new identifier with the new entity. The backend computer system 106 can also print the new identifier on a physical medium, e.g., in response to input from a team member.

Similarly to the example described above with reference to FIGS. 4A and 4B, the backend computer system 106 can have created a person entity and printed an identifier associated with the person entity on a physical medium 504. A team member can scan the identifier on the physical medium 504 and then scan the identifier on the physical medium 502 (FIG. 5B). The backend computer system 106 can recognize the sequence of scans as an input to create a new issue and assign the new issue to the person identified by the identifier on the physical medium 504. The team member can then scan an identifier on the physical medium 506, the identifier representing an undo operation. In response, the backend computer system 106 can undo the assignment of the new issue to the person. The team member can then scan an identifier on a physical medium 508 (FIG. 5C). The backend computer system 106 can recognize the sequence as an input to assign a new issue to the person.

In this manner, the backend computer system 106 can receive multiple first inputs of a respective multiple entity identifiers and multiple second inputs of respective multiple second operation identifiers. In some implementations, the backend computer system 106 can receive the inputs (e.g., two first inputs or two second inputs or a first input and a second input) in a sequence, and perform synchronization operations based on the received inputs. The backend computer system 106 can store multiple entity identifiers and multiple operation identifiers. Upon receiving multiple first inputs of the multiple entity identifiers, the backend computer system 106 can compare the received entity identifier (or identifiers) with the stored multiple entity identifiers to identify the entity (or entities) based on a result of the comparison.

Based on the received inputs, the backend computer system 106 can identify respective entities, perform operations on the entities, and synchronize the physical and virtual environments. The identifiers (e.g., the barcodes) printed on the physical media can enable the backend computer system 106 to quickly identify issues and operations that are to be or have been performed on the issues, and to synchronize the physical and virtual environments in which the issues are handled.

In some implementations, the backend computer system 106 can be configured to customize each identifier, e.g., in response to user input. For example, an identifier that identifies an issue can include a barcode, summary information describing the issue, a time stamp that identifies a time of creation of the entity or of the identifier (or both), and information identifying a project with which the issue is associated. In another example, an identifier that identifies a status entity can include some or all of the information included in the issue or status information (or both).

In some implementations, a bug (e.g., specialization of an issue in FIG. 2) in the software can be an issue that has a full lifecycle, e.g., a status, a priority, a person to whom fixing the bug is assigned, a project to which the code belongs and other similar lifecycle parameters. Thus, the bug can be represented by an entity identifier and can be associated with a status identifier, a priority identifier, a person identifier, and other similar identifiers. When a bug is identified, an identifier that identifies the bug can be printed on a physical medium, e.g., using the printer 102, and affixed to the task board making it visible for other team members. The workflow actions performed on the bug can be tracked as described above. The actions can be transferred from the physical environment to the virtual environment, e.g., using the barcode scanner. Doing so can update the status of the bug to people in geographic locations other than the conference room in which the developers are dealing with the bug or for project status reporting or both.

By doing so, the synchronization techniques described here can be implemented in the software development cycle as an xTreme Feedback Device (XFD) in a bug tracking system. The techniques described here can be used as an alternative or in addition to existing feedback techniques such as e-mail and other physical feedback techniques including, e.g., the use of toy rocket launchers, traffic lights, lava lamps, and other similar physical feedback. The techniques can alleviate disadvantages that can arise because the ad-hoc nature of incidents involving bugs makes advance planning for such incidents difficult and because it is difficult to maintain a history of the incidents.

Similar synchronization techniques can be implemented for bug reporting from within the software development team, the company, or from customers. In some implementations, other server computer systems, e.g., Customer Relationship Management systems can be connected to the backend computer system, e.g., for state transition of a business object in a business application or customer requirements/feature requests to the business application development team.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, for example, a machine-generated electrical, optical, or electromagnetic signal that is generated to encode information for transmission to suitable receiver apparatus for execution by a data processing apparatus. A computer storage medium, for example, the computer-readable medium, can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical and/or non-transitory components or media (for example, multiple CDs, disks, or other storage devices).

In some implementations, the operations described in this disclosure can be implemented as a hosted service provided on a server in a cloud computing network. For example, the computer-readable storage media can be logically grouped and accessible within a cloud computing network. Servers within the cloud computing network can include a cloud computing platform for providing cloud-based services. The terms "cloud," "cloud computing," and "cloud-based" may be used interchangeably as appropriate without departing from the scope of this disclosure. Cloud-based services can be hosted services that are provided by servers and delivered across a network to a client platform to enhance, supplement, or replace applications executed locally on a client computer. The system can use cloud-based services to quickly receive software upgrades, applications, and other resources that would otherwise require a lengthy period of time before the resources can be delivered to the system.

The operations described in this disclosure can be implemented as operations performed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example, an FPGA (field programmable gate array) or an ASIC (application-specific integrated circuit). The apparatus can also include, in addition to hardware, code that creates an execution environment for the computer program in question, for example, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, for example, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, for example, magnetic, magneto-optical disks, or optical disks. However, a computer need not have such devices. Moreover, a computer can be embedded in another device, for example, a mobile telephone, a personal digital assistant (PDA), a mobile audio or video player, a game console, a Global Positioning System (GPS) receiver, or a portable storage device (for example, a universal serial bus (USB) flash drive), to name just a few. Devices suitable for storing computer program instructions and data include all forms of non-volatile memory, media and memory devices, including by way of example semiconductor memory devices, for example, EPROM, EEPROM, and flash memory devices; magnetic disks, for example, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, for example, a CRT (cathode ray tube) or LCD (liquid crystal display) monitor, for displaying information to the user, and a keyboard, a pointing device, for example, a mouse or a trackball, or a microphone and speaker (or combinations of them) by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a backend component, for example, as a data server, or that includes a middleware component, for example, an application server, or that includes a front-end component, for example, a client computer having a graphical user interface or a Web browser through which a user can interact with an implementation of the subject matter described in this disclosure, or any combination of one or more such backend, middleware, or front-end components. The components of the system can be interconnected by any form or medium of digital data communication, for example, a communication network. Examples of communication networks include a local area network ("LAN") and a wide area network ("WAN"), an inter-network (for example, the Internet), and peer-to-peer networks (for example, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (for example, an HTML page) to a client device (for example, for purposes of displaying data to and receiving user input from a user interacting with the client device). Data generated at the client device (for example, a result of the user interaction) can be received from the client device at the server.

While this disclosure contains many specific implementation details, these should not be construed as limitations on the scope of any implementations or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

The invention claimed is:

1. A computer-implemented method to synchronize software development operations in real and virtual environments, the method comprising:
   receiving a first input of an entity identifier that identifies a software development entity included in a software development model, wherein the software development entity is a task, wherein the entity identifier that identifies the task is a barcode, and wherein the entity identifier is on a first physical medium;
   receiving a second input of an operation identifier that identifies a software development operation that has been performed on the software development entity in a physical environment, wherein the operation identifier is a barcode and wherein the operation identifier is on a second physical medium;
   identifying the software development entity and the software development operation in response to receiving the first input and the second input; and
   updating a virtual software development environment associated with the software development model to reflect that the software development operation has been performed on the software development entity in the physical environment.

2. The method of claim 1, wherein updating the virtual software development environment to reflect that the software development operation has been performed on the software development entity in the physical environment comprises synchronizing the physical environment and the virtual environment.

3. The method of claim 1, further comprising receiving a plurality of first inputs of a respective plurality of entity identifiers and receiving a plurality of second inputs of a respective plurality of operation identifiers.

4. The method of claim 1, wherein the physical medium includes at least one of a paper, an item of clothing, or any surface on which at least one of an entity or operation identifier is printable or computer-readable.

5. The method of claim 1, wherein the software development operation is one of a create operation, a delete operation, an undo operation, or an assign operation.

6. The method of claim 1, wherein the software development model includes at least one of an issue entity, a person entity, a priority entity, or a status entity.

7. The method of claim 1, wherein receiving the second input of the operation identifier comprises receiving a scan of the barcode from a barcode scanner.

8. The method of claim 1, wherein the physical environment is a collaborative software development environment.

9. The method of claim 1, further comprising storing a plurality of entity identifiers, each entity identifier identifying a respective software development entity included in the software development model, wherein identifying the software development entity comprises:
   comparing the received entity identifier to the plurality of entity identifiers; and
   identifying the software development entity based on a result of the comparing.

10. The method of claim 1, further comprising storing a plurality of operation identifiers, each operation identifier identifying a respective software development operation, wherein identifying the software development operation comprises:
   comparing the received operation identifier to the plurality of operation identifiers; and
   identifying the software development operation based on a result of the comparing.

11. The method of claim 1, further comprising:
   generating an instance of the software development entity in the virtual environment; and
   providing the instance of the software development entity and the entity identifier that identifies the software development entity on one or more physical media.

12. The method of claim 11, wherein providing the instance of the software development entity and the entity identifier comprises printing the task and the barcode on a physical medium.

13. The method of claim 1, further comprising:
   receiving a third input of a create operation identifier that identifies a create operation;
   automatically and without user intervention, generating an issue entity included in the software development model in response to receiving the third input; and
   presenting the generated issue entity.

14. A non-transitory computer-readable medium storing instructions executable by data processing apparatus to perform operations comprising:
   receiving a first input of an entity identifier that identifies a software development entity included in a software development model, wherein the software development entity is a task, wherein the entity identifier that identifies the task is a barcode, and wherein the entity identifier is on a first physical medium;
   receiving a second input of an operation identifier that identifies a software development operation that has been performed on the software development entity in a physical environment, wherein the operation identifier is a barcode and wherein the operation identifier is on a second physical medium;
   identifying the software development entity and the software development operation in response to receiving the first input and the second input; and
   updating a virtual software development environment associated with the software development model to reflect that the software development operation has been performed on the software development entity in the physical environment.

15. The medium of claim 14, wherein updating the virtual software development environment to reflect that the software development operation has been performed on the software development entity in the physical environment comprises synchronizing the physical environment and the virtual environment.

16. The medium of claim 14, wherein the software development operation is one of a create operation, a delete operation, an undo operation, or an assign operation, and wherein the software development model includes at least one of an issue entity, a person entity, a priority entity, or a status entity.

17. The medium of claim 14, further comprising storing a plurality of entity identifiers, each entity identifier identifying a respective software development entity included in the software development model, wherein identifying the software development entity comprises:
   comparing the received entity identifier to the plurality of entity identifiers; and
   identifying the software development entity based on a result of the comparing.

18. A system comprising:
   a processor; and
   a non-transitory computer-readable medium storing instructions executable by data processing apparatus to perform operations comprising:
      receiving a first input of an entity identifier that identifies a software development entity included in a software development model, wherein the software development entity is a task, wherein the
      entity identifier that identifies the task is a barcode, and wherein the entity identifier is on a first physical medium;
      receiving a second input of an operation identifier that identifies a software development operation that has been performed on the software development entity in a physical environment, wherein the operation identifier is a barcode and wherein the operation identifier is on a second physical medium;
      identifying the software development entity and the software development operation in response to receiving the first input and the
      second input; and
      updating a virtual software development environment associated with the software development model to reflect that the software development operation has been performed on the software development entity in the physical environment.

19. The system of claim 18, the operations further comprising:
   receiving a third input of a create operation identifier that identifies a create operation;
   automatically and without user intervention, generating an issue entity included in the software development model in response to receiving the third input; and
   presenting the generated issue entity.

20. The system of claim 18, wherein updating the virtual software development environment comprises:
   determining a software development operation that has previously been performed on the software development entity in the virtual environment prior to receiving the first input or the second input; and updating the determined software development operation with the identified software development operation received in the second input.

* * * * *